(12) United States Patent
Cansever

(10) Patent No.: US 12,311,917 B2
(45) Date of Patent: May 27, 2025

(54) METHOD FOR OPERATING A POWERTRAIN OF A MOTOR VEHICLE, IN PARTICULAR A CAR, AND MOTOR VEHICLE

(71) Applicant: Bayerische Motoren Werke Aktiengesellschaft, Munich (DE)

(72) Inventor: Uemit Cansever, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 531 days.

(21) Appl. No.: 17/423,515

(22) PCT Filed: Jan. 21, 2020

(86) PCT No.: PCT/EP2020/051320
§ 371 (c)(1),
(2) Date: Jul. 16, 2021

(87) PCT Pub. No.: WO2020/173617
PCT Pub. Date: Sep. 3, 2020

(65) Prior Publication Data
US 2022/0073053 A1    Mar. 10, 2022

(30) Foreign Application Priority Data
Feb. 28, 2019   (DE) ................ 10 2019 105 049.9

(51) Int. Cl.
*B60W 20/40*    (2016.01)
*B60W 10/06*    (2006.01)
(Continued)

(52) U.S. Cl.
CPC ............ *B60W 20/40* (2013.01); *B60W 10/06* (2013.01); *B60W 10/08* (2013.01); *F02D 41/0087* (2013.01); *F02N 11/04* (2013.01)

(58) Field of Classification Search
CPC ...... B60W 20/40; B60W 10/06; B60W 10/08; B60W 2510/0657; B60W 2710/083;
(Continued)

(56) References Cited

U.S. PATENT DOCUMENTS 6,487,998 B1   12/2002   Masberg et al.
8,150,595 B2    4/2012   Thompson et al.
(Continued)

FOREIGN PATENT DOCUMENTS

CN    104421017 A    3/2015
CN    105526018 A    4/2016
(Continued)

OTHER PUBLICATIONS

Chinese-language Office Action issued in Chinese Application No. 202080008226.X dated Nov. 9, 2022 with English translation (15 pages).
(Continued)

*Primary Examiner* — Yi-Kai Wang
(74) *Attorney, Agent, or Firm* — Crowell & Moring, LLP

(57) ABSTRACT

A method operates a motor vehicle powertrain having at least one electric machine and an internal combustion engine, wherein the internal combustion engine has at least one first cylinder and at least one second cylinder. During a first operating phase, the first cylinder and the second cylinder are activated simultaneously so that during the first operating phase the motor vehicle is driven by way of the first cylinder and by way of the second cylinder. During a transition phase that follows the first operating phase, at least the first cylinder is switched off, while at least the second cylinder remains activated. And, during a second operating phase that follows the transition phase, the first cylinder is switched off and simultaneously the second cylinder is activated so that during the second operating phase the (Continued)

motor vehicle is driven at least by way of the second cylinder.

8 Claims, 1 Drawing Sheet

(51) Int. Cl.
*B60W 10/08* (2006.01)
*F02D 41/00* (2006.01)
*F02N 11/04* (2006.01)

(58) Field of Classification Search
CPC ...... F02D 41/0087; F02D 29/06; F02D 17/02; F02N 11/04; Y02T 10/62
USPC .......................................................... 701/22
See application file for complete search history.

(56) References Cited

U.S. PATENT DOCUMENTS

| | | | |
|---|---|---|---|
| 2005/0164828 A1 | 7/2005 | Polom et al. | |
| 2006/0032684 A1* | 2/2006 | Rayl | B60W 20/00 180/65.25 |
| 2006/0196463 A1 | 9/2006 | Pallett et al. | |
| 2009/0259380 A1 | 10/2009 | Picron et al. | |
| 2010/0042279 A1* | 2/2010 | Thompson | B60W 20/10 701/22 |
| 2011/0130902 A1* | 6/2011 | Heisel | B60W 20/10 180/65.265 |
| 2015/0053174 A1 | 2/2015 | Nishimoto et al. | |
| 2016/0108835 A1 | 4/2016 | Kees et al. | |
| 2018/0334160 A1* | 11/2018 | Kava | B60W 20/13 |

FOREIGN PATENT DOCUMENTS

| | | |
|---|---|---|
| DE | 195 32 164 A1 | 3/1997 |
| DE | 10 2005 003 253 A1 | 8/2005 |
| DE | 10 2004 011 811 A1 | 9/2005 |
| DE | 10 2015 224 342 A1 | 8/2016 |
| EP | 1 128 044 A2 | 8/2001 |
| WO | WO 2008/012432 A1 | 1/2008 |

OTHER PUBLICATIONS

International Search Report (PCT/ISA/210) issued in PCT Application No. PCT/EP2020/051320 dated Apr. 22, 2020 with English translation (four (4) pages).
German-language Written Opinion (PCT/ISA/237) issued in PCT Application No. PCT/EP2020/051320 dated Apr. 22, 2020 (six (6) pages).
German-language Search Report issued in German Application No. 10 2019 105 049.9 dated Jan. 30, 2020 with partial English translation (12 pages).
Chinese-language Office Action issued in Chinese Application No. 202080008226.X dated Aug. 1, 2023 with English translation (11 pages).

* cited by examiner

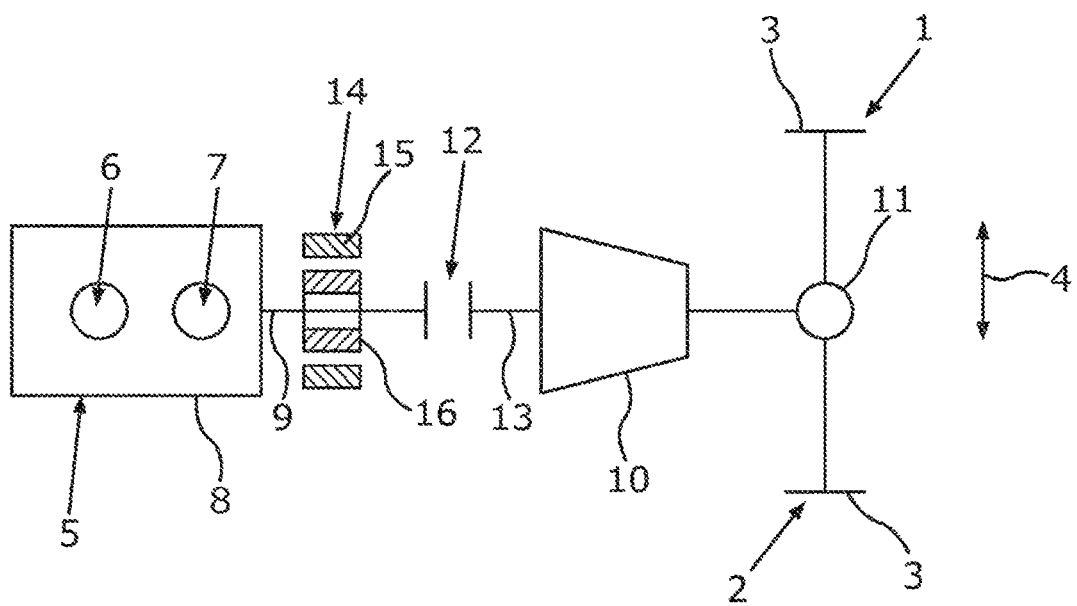

METHOD FOR OPERATING A POWERTRAIN OF A MOTOR VEHICLE, IN PARTICULAR A CAR, AND MOTOR VEHICLE

BACKGROUND AND SUMMARY OF THE INVENTION

The invention relates to a method for operating a powertrain of a motor vehicle, in particular a car. In addition, the invention relates to a motor vehicle, in particular a car.

Such methods for operating powertrains of motor vehicles, in particular of cars designed, for example, as passenger cars, are already sufficiently known from the general prior art and, in particular, from series vehicle construction. In the method, the internal combustion engine, which is designed as a reciprocating piston engine for example, comprises at least one first cylinder and at least one second cylinder. During a first operating phase, the first cylinder and the second cylinder are activated simultaneously, and therefore the motor vehicle is driven by means of the first cylinder and by means of the second cylinder during the first operating phase. During a transition phase, which follows the first operating phase, at least the first cylinder is shut down, while the second cylinder remains activated. During a second operating phase, which follows the transition phase, the cylinder is shut down and the second cylinder is simultaneously activated, and therefore the motor vehicle is driven at least by means of the second cylinder, but not by means of the first cylinder, during the second operating phase.

Furthermore, DE 10 2015 224 342 A1 discloses a method for operating a hybrid drive of a vehicle. In this case, at least one internal combustion engine, which has at least two cylinders, and at least one rotating electric machine of the hybrid drive are used jointly for driving the vehicle in at least one transitional mode of the hybrid drive. During the transitional mode, at least one cylinder of the internal combustion engine is shut down at least temporarily, at least as a function of a respective demanded torque of the internal combustion engine and/or of a respective actuating speed of the gas pedal.

Furthermore, EP 1 128 044 A2 discloses a vehicle drive system. The vehicle drive system comprises an internal combustion engine having a plurality of cylinders, a device for shutting down some of the cylinders at partial load and an electric machine for actively damping rotational irregularities of the internal combustion engine.

It is the object of the present invention to provide a method and a motor vehicle such that particularly comfortable and efficient operation of the motor vehicle can be achieved.

According to the invention, this object is achieved by a method and by a motor vehicle having the features of the independent claims. Advantageous refinements of the invention form the subject matter of the dependent claims.

A first aspect of the invention relates to a method for operating a powertrain of a motor vehicle comprising at least one electric machine and an internal combustion engine, it being possible for the motor vehicle to be designed as a car, in particular as a passenger car, for example. In the method, the internal combustion engine, which is preferably designed as a reciprocating piston engine and is also referred to as an engine or combustion engine, comprises at least one first cylinder and at least one second cylinder. In the respective cylinder, a respective piston is received in a translationally movable manner, for example. The internal combustion engine has, for example, an output shaft, in particular an output shaft designed as a crankshaft, which is rotatably mounted on a housing of the internal combustion engine, designed as a crankcase, for example. In this case, the pistons are coupled to the crankshaft in an articulated manner, in particular via respective connecting rods, with the result that translational movements of the pistons in the cylinders are converted into a rotational movement of the crankshaft.

During fired operation of the internal combustion engine, combustion processes, by means of which the respective piston is driven, take place in the cylinders. As a result, a torque acting on the output shaft is generated in the respective cylinder or by means of the respective cylinder, by means of which torque the output shaft is driven and thereby rotated relative to the housing. Via the output shaft, the internal combustion engine can provide a total drive torque for driving the motor vehicle. The total drive torque results, for example, from the respective torque which is generated by means of the respective cylinder and subsequently acts on the output shaft.

During a first operating phase of the method, the first cylinder and the second cylinder are activated simultaneously, and therefore the motor vehicle is driven by means of the first cylinder and by means of the second cylinder during the first operating phase. The feature that the respective cylinder is activated is to be understood as meaning that combustion processes take place in the respective activated cylinder, as a result of which the respective piston and thus the crankshaft are driven. Thus, the first operating phase is, for example, the fired mode of the internal combustion engine, and therefore both the first cylinder and the second cylinder are in the fired mode during the first operating phase, for example. As a result, during the first operating phase for example, a respective torque is generated or provided both by means of the first cylinder and by means of the second cylinder, which torque acts on the output shaft and thereby drives the output shaft.

During a transition phase, which follows the first operating phase, at least the first cylinder is shut down, while at least the second cylinder remains activated. This means that the second cylinder is activated during the transition phase, and therefore combustion processes take place in the second cylinder during the transition phase. In other words, the second cylinder is in its fired mode during the transition phase, the fired mode of the first cylinder being terminated during the transition phase or in the transition phase. To shut down the first cylinder, introduction, in particular injection, of fuel into the first cylinder is terminated, for example, and/or ignition in the first cylinder is shut down, and therefore no combustion processes take place in the first cylinder while the first cylinder is shut down. The shut-down first cylinder is then in its unfired mode, and therefore it is not the piston arranged in the first cylinder which drives the output shaft, for example, but the output shaft which drives the piston arranged in the first cylinder. Thus, if the first cylinder is shut down or deactivated, no torque for driving the output shaft can be provided or generated by means of the first cylinder. Thus, if the first cylinder is deactivated or shut down, while the second cylinder is still activated, for example, and therefore the second cylinder is still in its fired state, then, for example, the piston arranged in the first cylinder is taken along by the output shaft and by the piston arranged in the second cylinder.

The transition phase preferably follows the first operating phase immediately or directly, and therefore deactivation and subsequent activation of the first cylinder and of the second cylinder are omitted between the first operating phase and the transition phase.

During a second operating phase, which follows the transition phase, the first cylinder is shut down or deactivated, and the second cylinder is simultaneously activated. As a result, the motor vehicle is driven at least by means of the second cylinder during the second operating phase. The motor vehicle is not driven by the first cylinder during the second operating phase. The second operating phase preferably follows the transition phase immediately or directly, and therefore activation and subsequent deactivation of the first cylinder and of the second cylinder are omitted between the transition phase and the second operating phase.

For example, the feature that the motor vehicle is driven at least by means of the first cylinder and by means of the second cylinder during the first operating phase can be understood to mean that the internal combustion engine has further cylinders provided in addition to the first cylinder and in addition to the second cylinder. For example, the further cylinders are likewise activated during the first operating phase. Provision can furthermore be made for at least one of the further cylinders to be shut down during the transition phase, while at least one other of the further cylinders remains activated during the transition phase. Alternatively or additionally, provision can be made for the at least one further cylinder to be deactivated during the second operating phase, while the at least one other further cylinder is activated during the second operating phase or remains activated, for example. As a result, the motor vehicle is driven by means of the second cylinder and by means of the at least one other of the further cylinders during the second operating phase, for example. Since at least the first cylinder is deactivated or shut down during the second operating phase, the motor vehicle is not driven by means of the first cylinder during the second operating phase. The first cylinder is in its unfired mode during the second operating phase.

In order to be able to achieve particularly comfortable and at the same time efficient operation of the internal combustion engine and thus of the powertrain and of the motor vehicle as a whole, it is envisaged according to the invention that, during the transition phase, a torque for driving the motor vehicle or for driving the output shaft which is lost by shutting down the first cylinder and is provided by means of the first cylinder during the first operating phase, for example, is provided by the electric machine by means of a motor mode of the electric machine, and the motor vehicle is thereby driven by means of the torque provided by the electric machine until the torque which is lost by shutting down is provided by means of the activated second cylinder and is thus exerted on the output shaft, for example, whereupon the motor mode of the electric machine is terminated in the transition phase. In other words, the lost torque is compensated by means of the electric machine, by the motor mode thereof, until the lost torque is provided by means of the second cylinder and, in particular, exerted on the output shaft. When the torque which is lost by shutting down the first cylinder is being provided by means of the second cylinder and, as a result, is being exerted, in particular, on the output shaft and thereby compensated, the motor mode of the electric machine is then terminated. The second cylinder then provides the torque which is lost by shutting down the first cylinder, for example, and an additional torque, which is or has already been provided, by means of the second cylinder for example, during the first operating phase.

The torque which is lost by shutting down the first cylinder is to be understood, in particular, to mean the following: as described above, a first torque is provided or generated by means of the first cylinder, for example first of all and in particular during the first operating phase, and a second torque is provided or generated by means of the second cylinder, both the first torque and the second torque acting on the output shaft and thus driving the output shaft, in particular during the first operating phase. An at least temporary or briefly occurring operating phase is, for example, a part-load mode or part-load range of the internal combustion engine. The sum of the first torque and the second torque is also referred to, for example, as the sum torque. In this case, for example, the sum torque acts on the output shaft during the first operating phase. If the first cylinder is now shut down, the first cylinder can no longer provide or generate the first torque. The first torque is thus lost. In order to avoid unwanted effects resulting from shutting down the first cylinder, such as jerking and/or a sudden decrease in the speed of the motor vehicle, it is advantageous to compensate for and thus balance out the lost first torque, for example in such a way that the first torque is generated or provided by means of a device which is different from and provided in addition to the first cylinder and is exerted, in particular, on the output shaft. This takes place during the second operating phase by means of the activated second cylinder, and therefore the second cylinder is used as the aforementioned device during the second operating phase. Thus, during the second operating phase, for example, the second cylinder provides both the second torque and the lost first torque. It is thereby possible to operate the internal combustion engine in a particularly advantageous operating or load range, and it is therefore possible, by shutting down the first cylinder, to ensure particularly efficient and thus fuel-saving operation of the internal combustion engine.

However, in order for the second cylinder to be able to generate or provide both the second torque and the lost first torque, a charge of the second cylinder is increased, for example, in particular compared with the first operating phase, in particular during the transition phase. This increase in the charge cannot take place infinitely rapidly, but requires a certain time, also referred to as build-up time or increase time. During the build-up time, however, the first cylinder is already deactivated or shut down. In order now, for example, to be able to avoid or at least keep particularly small unwanted effects resulting from the shutting down of the first cylinder and thus from the omission of the first torque during the build-up time, which, in particular, lies in the transition phase, the lost first torque is provided by the electric machine during the transition time or during the build-up time and is exerted on the output shaft, for example, and/or on some other, further shaft provided in addition to the output shaft, in particular until the charge of the second cylinder has been sufficiently increased, thus ensuring that the second cylinder can provide or provides the first, lost torque, in particular in addition to the second torque. As a result, unwanted effects resulting from shutting down the first cylinder, such as a jerk perceptible by occupants or passengers of the motor vehicle, can be avoided, and it is thus possible to achieve particularly comfortable operation of the motor vehicle by means of the method according to the invention.

The first operating phase is, for example, a so-called all-engine mode, in which, for example, all cylinders of the internal combustion engine are operated in their respective fired mode during the first operating phase.

If half of the cylinders of the internal combustion engine are deactivated during the transition phase, for example, the second operating phase is, for example, a so-called half-engine operating phase or a so-called half-engine mode of the internal combustion engine since, during the second operating phase, a first half of the cylinders is operated in the fired mode and the second half of the cylinders is operated in the unfired mode. In other words, the first half of the cylinders is activated during the half-engine mode, while the second half of the cylinders is shut down or deactivated.

The shutting down of cylinders, also referred to as cylinder shutdown, and in particular the above-described half-engine mode, make it possible to operate the internal combustion engine particularly effectively, particularly at partial load of the internal combustion engine, and at the same time to operate it at a load point which is favorable for efficiency. This has proven to be advantageous particularly when the internal combustion engine is designed as a spark-ignition engine. In the half-engine mode, the activated cylinders supply the torques which are lost by shutting down the corresponding other cylinders and which are provided, during the full-engine mode for example, by the first half of the cylinders which is still activated during the full-engine mode and are thus exerted on the output shaft, for example. Here, the transition phase represents a transition, for example, from the full-engine mode to a half-engine mode and should not be noticeable, for example, to the driver of the motor vehicle. For this purpose, it is usually provided that during the transition phase the charge, in particular the air charge, is increased in all cylinders of the internal combustion engine and thus, for example, both in the first cylinder and in the second cylinder, while conventionally the respective ignition angle of the respective cylinder is simultaneously retarded in comparison with the first operating phase.

As a result, in spite of the increased charge, the cylinders which were initially still activated provide the same torque overall, in particular the sum torque, as before the increase in the charge and before the retarding of the ignition angle.

After the charge has been increased after the retarding of the ignition angle, the first half of the cylinders can be shut down, the ignition angle of the second half of the cylinders then being advanced again, for example, in particular simultaneously. In combination with the increased charge of the cylinders, the cylinders that are still activated, i.e. the activated second half of the cylinders, provides the sum torque which was previously provided by all the cylinders when all the cylinders were still activated.

If the desired charge is thus achieved as a result of the increase in the charge in all the cylinders, the ignition angle of the first half of the cylinders is simultaneously advanced. The transition phase is thereby terminated, and the second operating phase, in particular the half-engine mode, follows the transition phase. One disadvantage of this conventional procedure is that the ignition angle is usually retarded during the transition phase. This leads to fuel consumption and emission disadvantages, which can now be avoided by the method according to the invention.

Since it is provided according to the invention that the torque which is lost by shutting down the first cylinder is provided by the electric machine and is thus compensated by the electric machine, it is possible to dispense with retardation of the ignition angle. In the method according to the invention, the electric machine supplies the torque which is lost by shutting down the first cylinder until, for example, the charge of the second cylinder is or has been adjusted, in particular increased, in such a way that, in particular in conjunction with an advantageous ignition angle of the second cylinder, the second cylinder can provide and does provide the lost torque. The motor mode of the electric machine can then be terminated since then, for example, with reference to the second cylinder and with reference to the electric machine, the lost torque is provided exclusively by the second cylinder but not by the electric machine. As a result, a particularly advantageous ignition angle can be or is set, in particular during the transition phase and preferably also during the first operating phase and during the second operating phase, and therefore, for example, the transition from the first operating phase to the second operating phase, in particular from the full-engine mode to the half-engine mode, can be carried out particularly comfortably and with low fuel consumption and emissions.

The motor mode of the electric machine is to be understood to mean that the electric machine is operated as an electric motor in its motor mode. In this case, the electric machine has, for example, a stator and a rotor which can be driven by the stator and can thereby be rotated about an axis of rotation relative to the stator, which rotor is driven by the stator in the motor mode and is thereby rotated about the axis of rotation relative to the stator. Via the rotor, the electric machine can provide, that is to say output, the torque which is lost by shutting down the first cylinder.

In order to achieve a particularly comfortable transition from the first operating phase to the second operating phase, it is provided in one embodiment of the invention that the motor mode of the electric machine does not occur at least during a part of the second operating phase that follows the transition phase, in particular immediately. The feature that the part immediately follows the transition phase is to be understood in particular to mean that activation and subsequent termination of the motor mode of the electric machine are omitted between the termination of the motor mode of the electric machine and the second operating phase or in the second part, and therefore the motor mode is omitted or remains terminated after the termination of the motor mode and at least during the part of the second operating phase. As a result, unwanted changes in speed of the motor vehicle resulting from the transition from the first operating phase to the second operating phase, for example, can be reliably avoided, and particularly comfortable operation can therefore be ensured. This part of the second operating phase can be followed, for example, by a second part of the operating phase, in particular immediately, the motor mode being activated during the second part, for example. As a result, driving is performed simultaneously both by means of the second cylinder and by means of the electric machine during the second part of the motor vehicle, for example. This makes it possible to achieve a so-called boost mode, also referred to as an acceleration mode, in which, for example, a particularly strong acceleration of the motor vehicle is brought about by means of the electric machine, which drives the motor vehicle in addition to the second cylinder.

It has also proven particularly advantageous if, during the transition phase, the charge of the second cylinder is increased, as a result of which the torque which is lost by shutting down is provided by means of the activated second cylinder. Particularly comfortable operation can thereby be achieved.

A further embodiment is distinguished by the fact that the electric machine has an electric voltage, in particular a rated electric voltage or an electric operating voltage, of at most 50 volts, in particular of at most 48 volts. The weight of the powertrain can thereby be kept particularly low, and therefore particularly efficient operation can be achieved. It is also conceivable for the electric machine to be operable or to be operated in or by means of a 48-volt vehicle electrical system of the motor vehicle, the 48-volt vehicle electrical system having or providing an electric voltage, in particular an operating voltage or a rated electric voltage, of 48 volts, the electric machine being operable or being operated by means of the electric voltage provided by the 48-volt vehicle electrical system. It is also conceivable for the electric machine to be a high-voltage component which has an electric voltage, in particular an electric operating voltage or rated voltage, which is greater than 50 volts, in particular greater than 60 volts, and is, for example, greater than 100 volts or is several hundred volts. In addition, it is possible for the electric machine to have an electric voltage, in particular an electric operating voltage or rated voltage, which is at most 12 volts or is 12 volts. Thus, the electric machine can be designed as a 12-volt starter-generator, for example.

The electric machine is preferably a motor-operated, in particular motor-controllable, electric machine which is connected or can be connected, for example either directly via a traction means such as, for example, a belt or via a clutch to the internal combustion engine, also referred to as a combustion engine, in particular in such a way that torques can be transmitted from the electric machine to the internal combustion engine, in particular to the output shaft, in particular via the traction means or via the clutch. The electric machine can thereby assist the engine.

In order to achieve particularly efficient and comfortable operation, it is provided in a further embodiment of the invention that a starter-generator, in particular an integrated starter-generator, is used as the electric machine, wherein the torque provided by the electric machine is transmitted from the rotor of the electric machine via a traction means, in particular via a belt, to a shaft, in particular to the output shaft, of the powertrain. The electric machine is thus designed as an integrated belt-type starter-generator, for example.

A further embodiment is distinguished by the fact that a starter-generator, in particular an integrated starter-generator, is used as the electric machine, the rotor of which is arranged coaxially with the shaft of the powertrain.

The rotor is preferably arranged on the shaft. In this case, the shaft will also transmit the torque provided by the electric machine, in particular by its rotor, from the rotor of the electric machine. The installation space requirement can thereby be kept particularly low. Furthermore, the weight can thereby be kept particularly low, as a result of which particularly efficient operation can be achieved.

In a particularly advantageous embodiment of the invention, it is envisaged that the ignition angle of the second cylinder is not retarded during the transition phase in comparison with the first operating phase. The fuel consumption and the emissions of the internal combustion engine can thereby be kept particularly low.

A second aspect of the invention relates to a motor vehicle designed, for example, as a car, in particular as a passenger car, which is designed to carry out a method according to the invention as per the first aspect of the invention. Advantages and advantageous embodiments of the first aspect of the invention are to be regarded as advantages and advantageous embodiments of the second aspect of the invention and vice versa.

The method is carried out, for example, by means of an electronic computing device, also referred to as a control unit, of the powertrain, in particular of the motor vehicle, and therefore the electronic computing device of the motor vehicle is designed to carry out the method according to the invention as per the first aspect of the invention.

Further details of the invention will be found in the following description of a preferred exemplary embodiment with the associated drawing.

BRIEF DESCRIPTION OF THE DRAWING

The single FIGURE is a schematic illustration of a powertrain which is designed to carry out an exemplary method according to the invention.

DETAILED DESCRIPTION OF THE DRAWING

The single FIGURE shows, in a schematic illustration, a powertrain 1 of a motor vehicle designed, for example, as a car, in particular as a passenger car, which can be driven by means of the powertrain 1 or, in particular, is driven during the method. The powertrain 1 has at least one axle 2 with wheels 3 which are spaced apart from one another in the transverse direction of the vehicle. The transverse direction of the vehicle is illustrated in the FIGURE by a double arrow 4. The wheels 3 are ground contact elements, by means of which the motor vehicle is supported on a roadway when traveling along the roadway. During travel, the wheels 3 roll on the roadway. The powertrain 1 comprises at least or precisely one internal combustion engine 5, also referred to as an engine or combustion engine, by means of which the wheels 3 and thus the motor vehicle can be driven or are driven during the method. The internal combustion engine 5 has at least one first cylinder 6 and at least one second cylinder 7, which are formed or delimited, for example, by a housing 8 of the internal combustion engine 5, which is designed in particular as a cylinder housing. Respective pistons are arranged so as to be translationally movable in the cylinders 6 and 7, for example, the pistons being translationally movable relative to the housing part 8. Here, the internal combustion engine 5 has an output shaft 9, designed as a crankshaft for example, via which the internal combustion engine 5 can provide drive torques for driving the wheels 3. The output shaft 9 is rotatable about an axis of rotation relative to the housing part 8. In this case, the pistons are coupled to the output shaft 9 in an articulated manner via respective connecting rods, with the result that translational movements of the pistons in the cylinders 6 and 7 can be converted into a rotational movement of the output shaft 9, or are converted into such a movement during the method.

The powertrain 1 furthermore comprises at least one transmission 10, also referred to as a main transmission, via which the wheels 3 can be driven by the internal combustion engine 5. In this case, the axle 2 comprises an axle transmission 11 designed, for example, as a differential transmission, it being possible for the wheels 3 to be driven by the internal combustion engine 5 via the axle transmission 11 and via the transmission 10. In this case, the transmission 10 can be driven by the internal combustion engine 5, in particular by the output shaft 9, via a starting element 12 designed, for example, as a friction clutch. In this case, for example, an input shaft 13 of the transmission 10 can be driven by the output shaft 9 via the starting element 12.

The powertrain 1 furthermore has at least one electric machine 14, which comprises a stator 15 and a rotor 16. The rotor 16 can be driven by the stator 15 and can thereby be rotated relative to the stator 15 about a machine axis of rotation of the electric machine 14. The electric machine 14 can be operated, for example, in a motor mode and thus as an electric motor. In the motor mode, the rotor 16 is driven by the stator 15 and is thereby rotated about the machine axis of rotation relative to the stator 15. In the motor mode, the electric machine 14 provides, via the rotor 16, a torque, also referred to as machine torque, by means of which, for example, the wheels 3 can be driven, in particular via the starting element 12, via the transmission 10 and via the axle transmission 11.

It is furthermore conceivable for the electric machine 14 to be operable in a generator mode and thus as a generator. In the generator mode, the rotor 16 is driven by the wheels 3 of the moving motor vehicle and is thereby rotated relative to the stator 15 about the machine axis of rotation. In this case, kinetic or mechanical energy of the rotor 16 and thus of the motor vehicle is converted by means of the generator into electrical energy which can be provided by the electric machine 14.

In the exemplary embodiment illustrated in the FIGURE, the rotor 16 is arranged coaxially with the output shaft 9 and, at the same time, is arranged on the output shaft 9, with the result that the respective machine torque can be transmitted from the rotor 16, in particular directly, to the output shaft 9. The output shaft 9 can thereby be driven. Since the rotor 16 is arranged coaxially with the output shaft 9, the machine axis of rotation coincides with the axis of rotation of the output shaft 9.

In the following, a method for operating the powertrain 1 is explained, it being possible by means of the method to achieve particularly efficient and comfortable operation of the powertrain 1 and thus of the motor vehicle as a whole. In the method, the powertrain 1 is operated in such a way that the first cylinder 6 and the second cylinder 7 are activated simultaneously during a first operating phase, and therefore the cylinders 6 and 7 are operated in their respective fired mode during the first operating phase. In the respective fired mode of the respective cylinder 6 or 7, combustion processes take place in the respective cylinder 6 or 7, in the course of which a respective fuel-air mixture is burned. The respective piston is thereby driven in the respective cylinder 6 or 7, as a result of which the piston exerts a respective torque, also referred to as individual torque, on the output shaft 9. Thus, in the fired mode of the respective cylinder 6 or 7 and thus during the first operating phase, the respective individual torque is provided or generated by means of the respective cylinder 6 or 7, which torque is exerted on the output shaft 9 and thus drives the output shaft 9. Thus, the wheels 3 and thus the motor vehicle are driven both by means of the first cylinder 6 and by means of the second cylinder 7 during the first operating phase. In sum, the individual torques result, for example, in a sum torque which acts on the output shaft 9 and thus drives the output shaft 9, it being possible, for example, for the output shaft 9 to provide the sum torque, in particular, to drive the wheels 3.

During a transition phase, which preferably follows the first operating phase immediately and thus directly, the first cylinder 6 is shut down, while the second cylinder 7 remains activated, for example. By shutting down the first cylinder 6, the first cylinder 6 is transferred from its fired mode into its unfired mode. Combustion processes that take place in cylinder 6 are not carried out during the unfired mode. During a second operating phase, which preferably follows the transition phase immediately or directly, the first cylinder 6 is or remains shut down and thus deactivated, and the second cylinder is or remains simultaneously activated and thus in its fired mode. As a result, with reference to cylinders 6 and 7, the output shaft 9 is driven exclusively by means of cylinder 7 and not by means of cylinder 6 during the second operating phase. In other words, during the second operating phase, in relation to the cylinders 6 and 7, at least one torque or individual torque is generated and provided exclusively by means of cylinder 7, which torque is exerted on the output shaft 9 and thus drives the output shaft 9. Since cylinder 6 is shut down and thus deactivated during the second operating phase, no torque which drives the output shaft 9 is generated or provided by means of cylinder 6 during the second operating phase. On the contrary, the piston arranged in cylinder 6 is driven and thus taken along by the piston arranged in cylinder 7 and by the output shaft 9. The shutting down of cylinder 6 is also referred to as cylinder shutdown.

The individual torque which is generated or provided by means of cylinder 7 and exerted on the output shaft 9 during the second operating phase corresponds, for example, to the sum torque which is provided and thus generated by means of both cylinders 6 and 7 and exerted on the output shaft 9 during the first operating phase. By shutting down cylinder 6, the individual torque which is provided by means of cylinder 6 during the first operating phase, for example, is lost, while cylinder 7 supplies the lost individual torque. Thus, during the second operating phase, for example, cylinder 7 provides both the individual torque lost by shutting down cylinder 6 and additionally the individual torque which cylinder 7 also provides or has provided during the first operating phase. Thus, during the second operating phase, for example, the second cylinder 7 provides the sum torque which was provided by means of both cylinders 6 and 7 during the first operating phase. In this way, particularly in a part-load range or in part-load operation of the internal combustion engine 5, particularly efficient and thus low-emission and fuel-saving operation can be ensured.

In order now to achieve particularly efficient and comfortable operation of the powertrain 1, during the transition phase, the torque for driving the output shaft 9 and thus the motor vehicle which is lost by shutting down cylinder 6 is provided by the electric machine 14 by means of a motor mode of the electric machine 14, and the motor vehicle is thereby driven by means of the torque provided by the electric machine 14 via the rotor 16 thereof until the torque which is lost by shutting down is provided by means of the activated second cylinder 7, whereupon the motor mode of the electric machine 14 is terminated in the transition phase. In this way, the lost torque is compensated by the electric machine 14 until, in particular only until, cylinder 7 can provide and does provide the sum torque. If cylinder 7 provides the sum torque and thus the lost torque, the motor mode of the electric machine 14 is terminated.

Then, for example, with reference to cylinders 6 and 7 and with reference to the electric machine 14, the output shaft 9 is driven, at least temporarily, exclusively by means of cylinder 7 or by means of the sum torque generated or provided by means of cylinder 7.

This makes it possible, in comparison with the first operating phase, to avoid retarding the ignition angle of cylinder 7 during the transition phase, thus enabling the internal combustion engine 5 to be operated in a manner which is particularly effective and hence particularly favorable for efficiency. Moreover, since the lost torque is provided and thus compensated by means of the electric machine 14, unwanted and uncomfortable effects resulting from shutting down cylinder 6, such as, for example, a jerk of the motor vehicle perceptible by occupants in the interior of the motor vehicle, can be reliably avoided. As a result, the motor vehicle can be operated in a particularly comfortable manner.

Overall, it can be seen that the electric machine 14 assists the internal combustion engine 5 at least briefly in or during the transition phase until a charge of the second cylinder 7 is built up to such an extent in comparison with the first operating phase, that is to say is increased to such an extent, that cylinder 7 and thus the internal combustion engine 5 can provide the sum torque alone, that is to say without the assistance of the electric machine 14. In order to avoid unwanted acceleration and thus jerks, the motor mode of the electric machine 14 is terminated when cylinder 7 is providing the sum torque.

LIST OF REFERENCE SIGNS 1 powertrain
2 axle
3 wheel
4 double arrow
in internal combustion engine,
6 first cylinder
7 second cylinder
8 housing part
9 output shaft
10 transmission
11 axle transmission
12 starting element
13 input shaft
14 electric machine
15 stator
16 rotor

What is claimed is:

1. A method for operating a motor vehicle powertrain comprising at least one electric machine and an internal combustion engine, wherein
 the internal combustion engine comprises at least one first cylinder that generates a first torque and at least one second cylinder that generates a second torque;
 the method comprises the steps of:
  during a first operating phase, the first cylinder and the second cylinder are activated simultaneously, and therefore the motor vehicle is driven by way of the first cylinder that generates the first torque and by way of the second cylinder that generates the second torque during the first operating phase;
  during a transition phase, which follows the first operating phase, at least the first cylinder is shut down, while at least the second cylinder remains activated; and
  during a second operating phase, which follows the transition phase, the first cylinder is shut down and the second cylinder is simultaneously activated, and therefore the motor vehicle is driven at least by way of the second cylinder during the second operating phase;
 wherein
 during the transition phase, the first torque configured to drive the motor vehicle which is lost by shutting down the first cylinder is provided by the electric machine via a motor mode of the electric machine, and the motor vehicle is thereby driven by way of the torque provided by the electric machine until the first torque which is lost by shutting down the first cylinder is provided by way of the activated second cylinder, whereupon the motor mode of the electric machine is terminated in the transition phase, and
 during the second operating phase the second cylinder provides the second torque having a same value as in the first operating phase and the lost first torque having a same value as the first torque in the first operating phase.

2. The method according to claim 1, wherein
 the motor mode of the electric machine does not occur at least during a part of the second operating phase that follows the transition phase.

3. The method according to claim 1, wherein
 during the transition phase, a charge of the second cylinder is increased, whereby the torque which is lost by shutting down the first cylinder is provided by way of the activated second cylinder.

4. The method according to claim 1, wherein
 a starter-generator is used as the electric machine, and
 the torque provided by the electric machine is transmitted from a rotor of the electric machine via a traction means, to a shaft of the powertrain.

5. The method according to claim 4, wherein
 the traction means is a belt.

6. The method according to claim 1, wherein
 a starter-generator is used as the electric machine, the rotor of which is arranged coaxially with a shaft of the powertrain, and
 the torque provided by the electric machine is transmitted to the shaft by the rotor of the electric machine.

7. The method according to claim 1, wherein
 during the transition phase, an ignition timing of the second cylinder is not retarded in comparison with the first operating phase.

8. A motor vehicle, comprising:
 a powertrain comprising at least one electrical machine and an internal combustion engine, wherein the internal combustion engine comprises at least one first cylinder that generates a first torque and at least one second cylinder that generates a second torque; wherein
 the powertrain is operatively configured to operate such that:
  during a first operating phase, the first cylinder and the second cylinder are activated simultaneously, and therefore the motor vehicle is driven by way of the first cylinder that generates the first torque and by way of the second cylinder that generates the second torque during the first operating phase;
  during a transition phase, which follows the first operating phase, at least the first cylinder is shut down, while at least the second cylinder remains activated; and
  during a second operating phase, which follows the transition phase, the first cylinder is shut down and the second cylinder is simultaneously activated, and therefore the motor vehicle is driven at least by way of the second cylinder during the second operating phase;
 wherein
 during the transition phase, the first torque configured to drive the motor vehicle which is lost by shutting down the first cylinder is provided by the electric machine via a motor mode of the electric machine, and the motor vehicle is thereby driven by way of the torque provided by the electric machine until the first torque which is lost by shutting down the first cylinder is provided by way of the activated second cylinder, whereupon the motor mode of the electric machine is terminated in the transition phase, and
 during the second operating phase the second cylinder provides the second torque having a same value as in the first operating phase and the lost first torque having a same value as the first torque in the first operating phase.

* * * * *